Sept. 13, 1966     G. POLLET     3,272,053
SHEAR-BLADE CONTROL MECHANISM
Filed Oct. 2, 1964     2 Sheets-Sheet 2
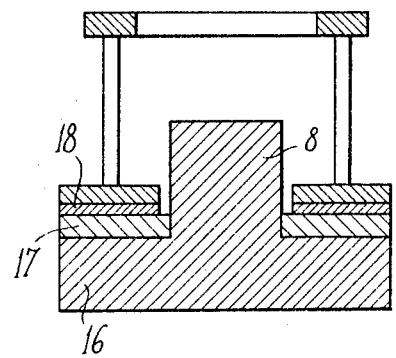
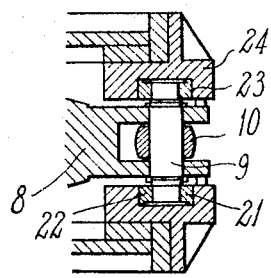
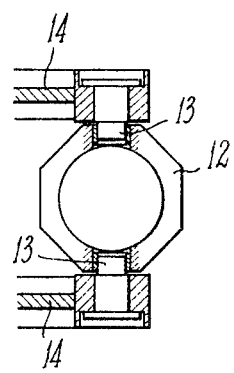
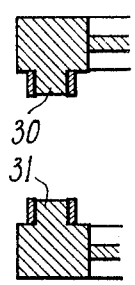
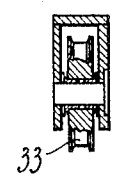
Inventor
Georges Pollet
By
Wenderoth, Lind & Ponack
Attorneys

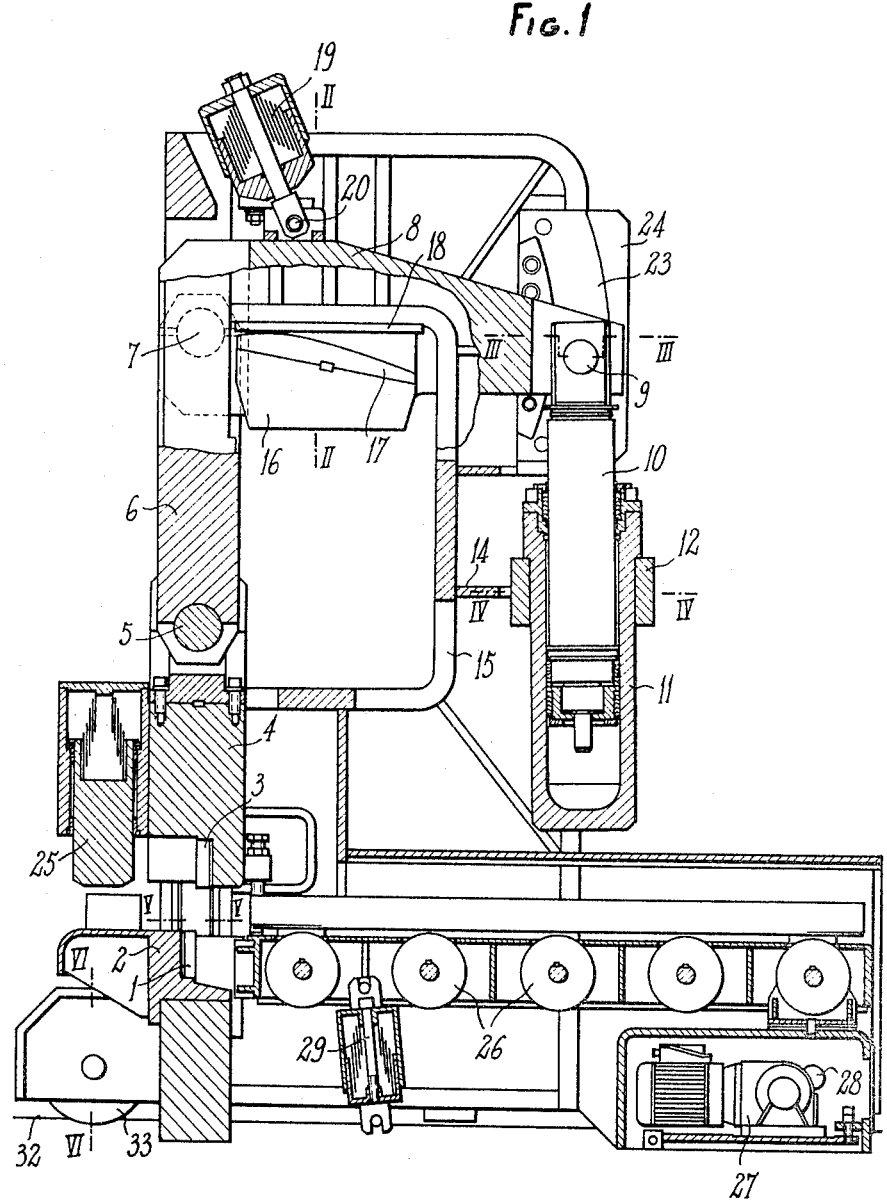

… … …

United States Patent Office 3,272,053
Patented Sept. 13, 1966

3,272,053
SHEAR-BLADE CONTROL MECHANISM
Georges Pollet, Saint-Chamond, France, assignor to Compagnie des Ateliers et Forges de la Loire, St. Chamond, Firminy, St. Etienne, Jacob-Holtzer
Filed Oct. 2, 1964, Ser. No. 401,125
Claims priority, application France, Oct. 11, 1963, 950,427, Patent 1,379,094
5 Claims. (Cl. 83—617)

The present invention relates to shears which have one blade fixed in relation to the frame, and the other blade movable to make the cutting stroke.

The invention relates more particularly to shears of this type in which the moving blade is subject to the action of a member which applies to it a force varying according to its position.

Shears are already known in which the member driving the moving blade takes the form of a ramp in contact with a roller. The disadvantage of such an arrangement is that the roller spindle, being subjected to considerable stresses, needs to be supported in heavy bearings. Also there is a great deal of wear which adversely affects the operation of the shears. Moreover, the bearings require constant maintenance, especially as regards lubrication.

The mechanism proposed according to the invention eliminates these drawbacks. The characterising feature of the invention is that it includes a rocker endowed with swinging motion, during which it rolls without slip on a rolling-contact track that is rigidly attached to the frame of the machine, this rocker constituting a lever in which the ratio between the arms varies according to its position and the action of which controls the travel of the moving shear blade according to a law determined by the shapes of the rolling surfaces.

One method of controlling the action of shears is by means of a mechanism which includes a rocker, in the form of a beam or the like endowed with swinging motion, during which it rolls directly on the moving blade and so imparts to it the requisite motion in relation to the fixed blade. A mechanism of this type is particularly advantageous for shearing metal plates, where the cutting effort travels along the blade.

The mechanism with which the invention is concerned has to do primarily with the shearing of billets, in which operation, though the position of the cutting force is fixed in relation to the blade, the value of this force varies considerably as the blade moves.

One embodiment of a mechanism according to the invention is now given, by way of example, with reference to the accompanying drawings, in which:

FIG. 1 is a vertical section of the mechanism;
FIG. 2 is a part section, taken on the line II—II in FIG. 1;
FIG. 3 is a horizontal section, taken on the line III—III in FIG. 1;
FIG. 4 is a horizontal section, taken on the line IV—IV in FIG. 1;
FIG. 5 is a horizontal section, taken on the line V—V in FIG. 1; and
FIG. 6 is a vertical section, taken on the line VI—VI in FIG. 1.

In the example illustrated, the mechanism comprises a fixed blade 1, rigidly attached to table 2, and a moving blade 3, rigidly fixed to a support 4, mounted by articulation 5 on connecting member 6. This member is articulated at 7 to a rocker 8, which is itself articulated at 9 to the driving unit, this latter being a ram in the example shown. The ram piston rod 10 acts on articulation 9. The ram cylinder 11 is fixed to support 12 mounted by means of pins 13 on arms 14, which are rigidly attached to machine frame 15.

Rocker 8 is integral with member 16, which serves to support rolling-contact track 17, this track itself being rigidly attached to support 16 by such means as keys or the like, whereby it remains detachable.

Rolling-contact track 17 is in contact with a fixed rolling-contact track 18, rigidly attached to the frame of the machine. This rolling-contact track 18 may be a plane surface, for example. When rocker 8 swings, under the action of the ram, the two rolling-contact tracks 17 and 18 work in conjunction with each other, so that, for a given force exerted by the ram, the resulting force varies with the travel of blade 3 in accordance with a law determined by the cross-sectional shape of these rolling-contact tracks.

The form of construction shown is an example in which, while the driving force is constant, the force exerted on moving blade 3 decreases as the travel of the blade increases.

A device consisting of a spring-loading system 19, for example, is provided to keep the rocker rolling-contact track 17, bearing against fixed rolling-contact track 18. This device is articulated both to the frame end, at 20, to the rocker. Slides 30 and 31 serve to guide the moving blade.

In order to furnish an additional connection between the driving system and the rocker, it is advantageous to provide, at the ends of spindle 9, as illustrated, pins 21, engaged in shoes 22, which move in slides 23 fitted in cheeks 24 carried by the frame.

The machine is complete with a bar presser 25, which holds the billet to table 2 as the cut is made. Table 2 is provided with rollers 26, which are turned by driving chains from motor reduction gearing 27. This table can be swung about pivot 28 when the cut has been made. Spring-loading system 29 restores it to the horizontal.

Table 2, which supports the machine as a whole, is mounted on rolling frame 32 through rollers 33, so that it can carry out translational movement during the cutting operation.

What is claimed is:

1. A mechanism for controlling shears of the type comprising one fixed and one moving blade, the latter being subject to the action of a member which applies to it a force varying with its position, a rocker endowed with swinging motion, during which it rolls without slip on a rolling-contact track rigidly attached to the frame of the machine, thus constituting a lever, the ratio between the lever arms varying according to its position, the action of this lever controlling the travel of the moving blade according to a law determined by the shapes of the rolling-contact surfaces.

2. A mechanism according to claim 1, in which one end of the rocker is subject to the action of a driving unit and the other is articulated to a connecting member, which in turn is articulated to the sliding moving blade, the rolling-contact surface of the rocker being held to a fixed rolling-contact surface, by means of an elastic system.

3. A mechanism according to claim 2, in which said elastic system holding the rolling-contact surface of the rocker to a fixed rolling-contact surface is a device, consisting of a spring-loading system, articulated both to said frame and to said rocker.

4. A mechanism according to claim 3 including a bar-presser, which holds the billet to table of said fixed blade as the cut is made, said table is provided with rollers, which are turned by driving chains from a motor reduction gearing and can be swung about pivot means when the cut has been made, said spring-loading system restoring it to the horizontal.

5. A mechanism according to claim 4 in which said table, which supports said machine as a whole, is mounted on rolling frame through rollers, so that it can carry out translational movement during the cutting operation.

References Cited by the Examiner
UNITED STATES PATENTS

| | | | |
|---|---|---|---|
| 2,162,133 | 6/1938 | Spire | 72—451 |
| 2,933,966 | 4/1960 | Dehn | 83—157 |

WILLIAM W. DYER, Jr., *Primary Examiner.*

L. TAYLOR, *Assistant Examiner.*